United States Patent
Della-Torre et al.

(10) Patent No.: US 9,071,620 B2
(45) Date of Patent: Jun. 30, 2015

(54) METHOD AND SYSTEM FOR ENABLING COMMUNICATION IN A HYBRID NETWORK

(75) Inventors: Reuven Della-Torre, Ramat Gan (IL); Shai Ophir, Moshav Ein-vered (IL); Ory Biran, Kiryat Tiv'on (IL); Edy Rozenfeld, Lod (IL); Noam Danon, Hod-hasharon (IL); Avi Alon, Ganei Tikvah (IL)

(73) Assignee: STARHOME GMBH, Zurich (CH)

( * ) Notice: Subject to any disclaimer, the term of this patent is extended or adjusted under 35 U.S.C. 154(b) by 801 days.

(21) Appl. No.: 12/742,607

(22) PCT Filed: Aug. 31, 2008

(86) PCT No.: PCT/IL2008/001179
§ 371 (c)(1),
(2), (4) Date: May 12, 2010

(87) PCT Pub. No.: WO2009/063448
PCT Pub. Date: May 22, 2009

(65) Prior Publication Data
US 2010/0246536 A1    Sep. 30, 2010

Related U.S. Application Data

(60) Provisional application No. 60/996,353, filed on Nov. 13, 2007.

(51) Int. Cl.
*H04B 7/216* (2006.01)
*H04L 29/06* (2006.01)

(52) U.S. Cl.
CPC ......... *H04L 65/1069* (2013.01); *H04L 65/1016* (2013.01); *H04L 65/104* (2013.01); *H04L 65/1073* (2013.01); *H04L 65/1036* (2013.01)

(58) Field of Classification Search
USPC .......... 370/335, 352, 338, 389; 455/445, 418, 455/552.1, 466, 432.2, 426.1, 436; 709/204, 223, 217
See application file for complete search history.

(56) References Cited

U.S. PATENT DOCUMENTS

| | | | |
|---|---|---|---|
| 2005/0025130 A1* | 2/2005 | Hoffmann | 370/352 |
| 2005/0058125 A1 | 3/2005 | Mutikainen et al. | |
| 2006/0276193 A1 | 12/2006 | Itzkovitz et al. | |
| 2007/0281704 A1* | 12/2007 | Lin et al. | 455/445 |
| 2008/0108347 A1* | 5/2008 | Jiang | 455/433 |

FOREIGN PATENT DOCUMENTS

| | | |
|---|---|---|
| EP | 1770949 A2 | 4/2007 |
| ES | 2253101 B1 | 7/2007 |
| WO | 2008075938 A2 | 6/2008 |

OTHER PUBLICATIONS

International Search Report and Written Opinion dated Jun. 24, 2009 in corresponding International Application No. PCT/IL2008/001179.

* cited by examiner

*Primary Examiner* — Jamal Javaid
(74) *Attorney, Agent, or Firm* — The Law Office of Michael E. Kondoudis (57) ABSTRACT

The invention provides a method and a system for enabling communication with a device (206) of a party operating in a hybrid network. The hybrid network combines an Internet-protocol based network (202) and a non-internet-protocol based network (203), wherein the device is an Internet-protocol based device (206). The method includes contacting a first registry being (209) a member in the non-Internet-protocol based network (203) for registering the device in the non-internet-protocol based network. The method also includes contacting a second registry (210) being a member in the Internet-protocol based network (202), for registering the device in the Internet-protocol based network.

16 Claims, 9 Drawing Sheets

METHOD AND SYSTEM FOR ENABLING COMMUNICATION IN A HYBRID NETWORK

FIELD OF THE INVENTION

The present invention relates to a method for enabling communication in computer networks environment and more specifically, to a method for enabling communication in a Hybrid network, combining an IP based network and a non-IP based network.

BACKGROUND OF THE INVENTION

Presently in the art there are available publications that handle the requirement to allow connections between users of IP-based networks and users of non-IP-based networks, such as circuit switched networks.

For example, US 2005/058125 ("IP-based services for circuit-switched networks", Mutikainen et al., published in 2005) describes a mechanism for providing a connection from an IP-based network to a circuit-switched network, such as a GSM network. A temporary routing number for the circuit-switched network, such as an E.164 number, is delivered to a user terminal, and a circuit-switched call leg is established from the user terminal to the IP-based network using the routing number. Thereby, IMS-services are provided for end users who are located in the radio access network not having sufficient QoS required for voice over IP. In the example of a conference call service, a request for a conference call may be forwarded via a data channel or data path to an application server which provides that conference call service. The application server then selects a conference routing number and returns the routing number to the conference host terminal via the data channel. Using the received conference routing number, the conference host terminal can then set up a circuit-switched connection as a call leg of the conference call.

Another example is ES 2253101 ("Authentication vector (AV) requesting and dispatching method involves generating AV based on type of service, and sending third message containing AV to IMS network", Ochoa and Sendra, published in 2006), disclosing an HLR that determines if an AV request is from an IMS service, a global system for mobile communications (GSM)/general packet radio service (GPRS) service or universal mobile telecommunication system (UMTS) service. An authentication center in the HLR generates the AV with a key associated with the subscriber identity, IMPI. The HLR sends a third message containing the AV to an IMS network: A first message requesting for the AV to authenticate a subscriber requesting IMS service is received by an HSS through an IMS network. The HSS processes the first message and sends a second message to the HLR.

WO 08075938 ("SCP-Controlled Overlay between GSM and IMS", Noldus and Terrill, published on 2008) describes a method of executing a service in a Media Gateway Control Function for establishing a call between a calling party's terminal served by a Mobile Switching Centre, and an IP Multimedia Subsystem Service. The Media Gateway Control Function is arranged to query a Service Control Point on which an overlay process is loaded. The correct SCP is identified by the MGCF using a correlation identifier originally published by the SCP itself after having received an IN service trigger from an MSC or GMSC. The MGCF will receive call related data from the SCP, such as the original dialed number. This data is used by the MGCF to populate information elements in a SIP Invite message. WO 08075938 gives a solution for providing GSM specific information, e.g. dialed number, location information, to an IMS service.

There is a need in the art to enable efficient communication with a party operating in a hybrid network combining an Internet-protocol based network and a non-Internet-protocol based network, wherein communication allows calling the party using an addressing scheme usable in the non-Internet-protocol based network.

SUMMARY OF THE INVENTION

According to the present invention, there is provided a method for enabling communication with a device of a party operating in a hybrid network combining an Internet-protocol based network and a non-Internet-protocol based network, wherein the device is an Internet-protocol based device, the method comprising:
 (a) contacting in a direct or indirect manner a first registry being a member in the non-Internet-protocol based network for registering the device in the non-Internet-protocol based network; and
 (b) contacting a second registry being a member in the Internet-protocol based network, for registering the device in the Internet-protocol based network;
 thereby allowing communication with the device by calling its respective Internet-protocol based address or non-Internet-protocol based address.

According to the present invention, there is also provided a method for initiating a connection between a device of a first party and a device of a second party, the device of the first party initiates the connection by using an addressing scheme usable in a non-Internet-protocol based network, the device of the second party operates an IP-base device in a hybrid network combining a non-Internet-protocol based network and an Internet-protocol based network, the method comprising:
 (a) obtaining a connection request whose destination is the device of the second party, wherein the connection request uses a non-Internet-protocol based signaling;
 (b) responding to the connection request by providing a route to a session control function being a member in the Internet-protocol based network which is combined in the hybrid network, the session control function serves the device of the second party.

The invention further provides a method for connecting a SIP client device to an Internet-protocol based network incompatible with the SIP client device, the method comprising:
 (a) obtaining packets;
 (b) if the packets are conveyed by the SIP client device
  i) converting the SIP packets into packets conforming with the Internet-protocol based network;
  ii) conveying the conforming packets to entities in the Internet-protocol based network, thus connecting the SIP client device with the Internet-protocol based network;
 (c) if the packets are conveyed to the SIP client device
  i) converting the packets into packets compatible with the SIP client device; and
  ii) conveying the compatible packets to the SIP client device.

The present invention further provides a system for enabling communication with a device of a party operating in a hybrid network combining an Internet-protocol based network and a non-Internet-protocol based network, wherein the device is an Internet-protocol based device, the system comprising:

(a) a non-Internet-protocol based registrar for contacting in a direct or indirect manner a first registry being a member in the non-Internet-protocol based network for registering the device in the non-Internet-protocol based network; and (b) an Internet-protocol based registrar for contacting a second registry being a member in the Internet-protocol based network, for registering the device in the Internet-protocol based network;

thereby allowing communication with the device by calling its respective Internet-protocol based address or non-Internet-protocol based address.

In addition, the present invention provides a system for initiating a connection between a device of a first party and a device of a second party, the device of the first party initiates the connection by using an addressing scheme usable in a non-Internet-protocol based network, the device of t party is an Internet-Protocol-based device operating in a hybrid network combining he second a non-Internet-protocol based network and an Internet-protocol based network, the system comprising:

(a) a non-Internet-protocol-based network connection module for obtaining a connection request whose destination is the device of the second party, wherein the connection request uses a non-Internet-protocol based signaling;

(b) an Internet-protocol-based network connection module for responding to the connection request by providing a route to a session control function being a member in the Internet-protocol based network which is combined in the hybrid network, the session control function serves the device of the second party.

Furthermore, the present invention provides a system for connecting a SIP client device to an Internet-protocol based network incompatible with the SIP client device, the method comprising:

(a) a SIP packets collector for obtaining packets;

(b) a SIP outgoing packets converter coupled to the SIP packets collector for converting packets that are conveyed by the SIP client device, including:

i) a SIP-to-IP protocol converter for converting the SIP packets into packets conforming with the Internet-protocol based network; and ii) an Internet-protocol-based conveying module, coupled to said SIP-to-IP protocol converter, for conveying the conforming packets to entities in the Internet-protocol based network, thus connecting the SIP client device with the Internet-protocol based network;

(c) a SIP incoming packets converter coupled to the SIP packets collector for converting packets that are conveyed to the SIP client device, including:

i) an IP-to-SIP protocol converter for converting the packets into packets compatible with the SIP client device; and ii) a SIP-client-device conveying module for conveying the compatible packets to the SIP client device.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF EXEMPLARY EMBODIMENTS

Figure 1:
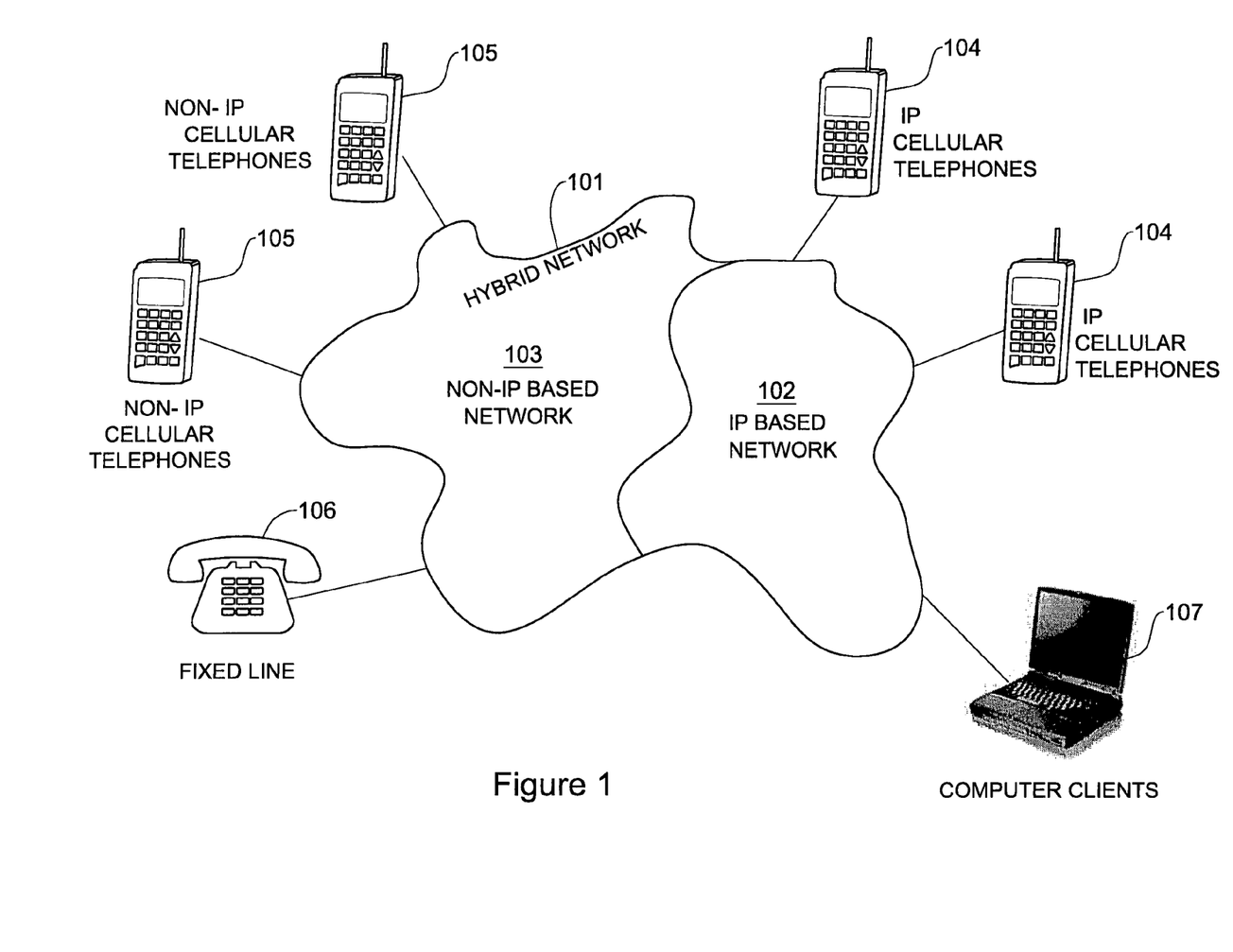
FIG. 1 is a diagram schematically illustrating a hybrid network, according to one embodiment of the invention.

FIG. 1 is a diagram schematically illustrating a hybrid network 101, according to one embodiment of the invention. The hybrid network combines an Internet-protocol based network and a non-Internet-protocol based network. Moreover, there may be more than one Internet-protocol based network and/or more than one non-Internet-protocol based network in the hybrid network 101, and therefore it is possible to define also that a hybrid network combines at least one Internet-protocol based network and at least one non-Internet-protocol based network.

Hereinafter, the term "Internet-Protocol" is shortened as IP, and therefore, "Internet-protocol based network" is also referred to as "IP based network", "non-Internet-protocol based network" is also referred to as "non-IP based network", etc. In addition, appreciating that IP is based on packets, or datagrams conveyed over the network, an IP-based network may be referred to also as a packet-switched network. Likewise, a non-IP-based network may be referred to as a circuit-switched network.

In the schematically illustrated hybrid network 101, comprised of IP based network 102 and non-IP based network 103, there are IP-based cellular telephones 104, non-IP-based cellular telephones 105, as well as fixed line telephones 106 and computers 107. However this is non-limiting and any other device that can form part of an end-node in an IP based network or in a non-IP based network, can form part of the hybrid network as well.

According to one embodiment of the invention there are different types of non-IP-based networks such as GSM (Global System for Mobile communications) and CDMA (Code Division Multiple Access).

In GSM, the details of each mobile phone subscriber, that is authorized to use the network, are stored in a central database called Home Location Register and known, shortly, as HLR. The HLR constitutes, hereinafter, a "first registry".

A Visitor Location Register (VLR) is a temporary database, a part of the GSM mobile phone system, which stores information, such as the current Location Area Identity (LAI), about all the mobile devices which are being part of the network and are currently under the control of the Mobile Switching Center (MSC), which the VLR serves.

While operating in a GSM network, mobile devices connect thereto by searching for cells in the close area. When the device connects to a new cell, if this cell is controlled by a new MSC and/or VLR, it has to register. The registration process is triggered when the MSC detects a new mobile station in its network. It should be appreciated that it is the LAI that identifies under which Base Station Controller (BSC) the mobile station is currently present. Then, the MSC creates a new record in the VLR, and it also updates the HLR, providing the new location of that mobile device.

In should be noted that in CDMA, HLR and VLR are also in use and therefore the non-IP based network can be also a CDMA network. Yet, this is also non-limiting and the invention can encompass other non-IP-based networks such as UMTS (Universal Mobile Telecommunications System).

The cellular networks described above (GSM, CDMA and UMTS) are non-IP based networks, while it should be appreciated that today there are IP based networks as well, such as, but not limited by IMS (IP Multimedia Subsystem, wherein IP stands for Internet Protocol), which is being used for delivering multimedia to devices by using IP protocols, such as the Session Initiation Protocol (SIP).

In IMS, subscribers' subscription-related information, such as subscribers' profiles, is stored in a database called Home Subscriber Server (HSS). In addition for storing information, the HSS performs authentication and authorization of the subscribers. Hereinafter, the HSS constitutes a "second registry".

The Call Session Control Function (CSCF), is a function in an IMS network, which is responsible for controlling subscribers' sessions (such as call sessions), and also interacts with network databases such as the HSS, e.g., for subscribers' authentication and for obtaining subscribers' information. The CSCF constitutes, hereinafter, a "session control function". Further below, with reference to FIG. 2, it will be explained that the term CSCF actually covers several function.

It is noted though, that the IMS is not the only IP based network available. Alternative IP-based networks exist, some of these being proprietary networks.

Returning now to FIG. 1, it should be appreciated that an IMS network may be combined with a GSM network in a hybrid network, wherein the IMS network is an IP-based network, such as network 103, and the GSM network is a non-IP-based network such as network 102.

Attempts to accomplish communication between two parties, wherein one party operates a GSM device connected either to the GSM network which is part of the hybrid network, or to another GSM network which is external to the hybrid network, while the other party operates an IMS device being part of the IMS network, may encounter difficulties.

An example would be a first party who wishes to conduct a call from a non-IP based device, to a second party operating an IP-based device, by calling a telephone number, which is composed of numbers only, such as in accordance with the MSISDN scheme. It is noted that the addressing scheme used for calling parties in the IP-based network may be different, and it is not limited to numbers. For example, an address such as "1234567@netname.com" may be acceptable in the IP-based network while the same address is not acceptable in the non-IP-based network.

In order to overcome such difficulties, traditional systems are enforced to check each non-IP-based dialed number (such as MSISDN) and to translate those dialed numbers that correspond to addresses which can be received and interpreted by the IP-based network (such as "Tel-URI" defined in IETF RFC 3966, or "SIP-URI" which is the SIP addressing scheme, wherein URI stands for Uniform Resource Identifier).

The invention provides an alternative solution to these difficulties, wherein the second party is a member in the hybrid network. This means that the second party's device operates in both GSM and IMS networks, or in other words, that the second party is registered in the two networks. Calls obtained (or initiated) by the GSM network are initially handled and routed inside the GSM network, and then call control is transferred to the IMS network, for reaching the IMS subscriber.

Figure 2:
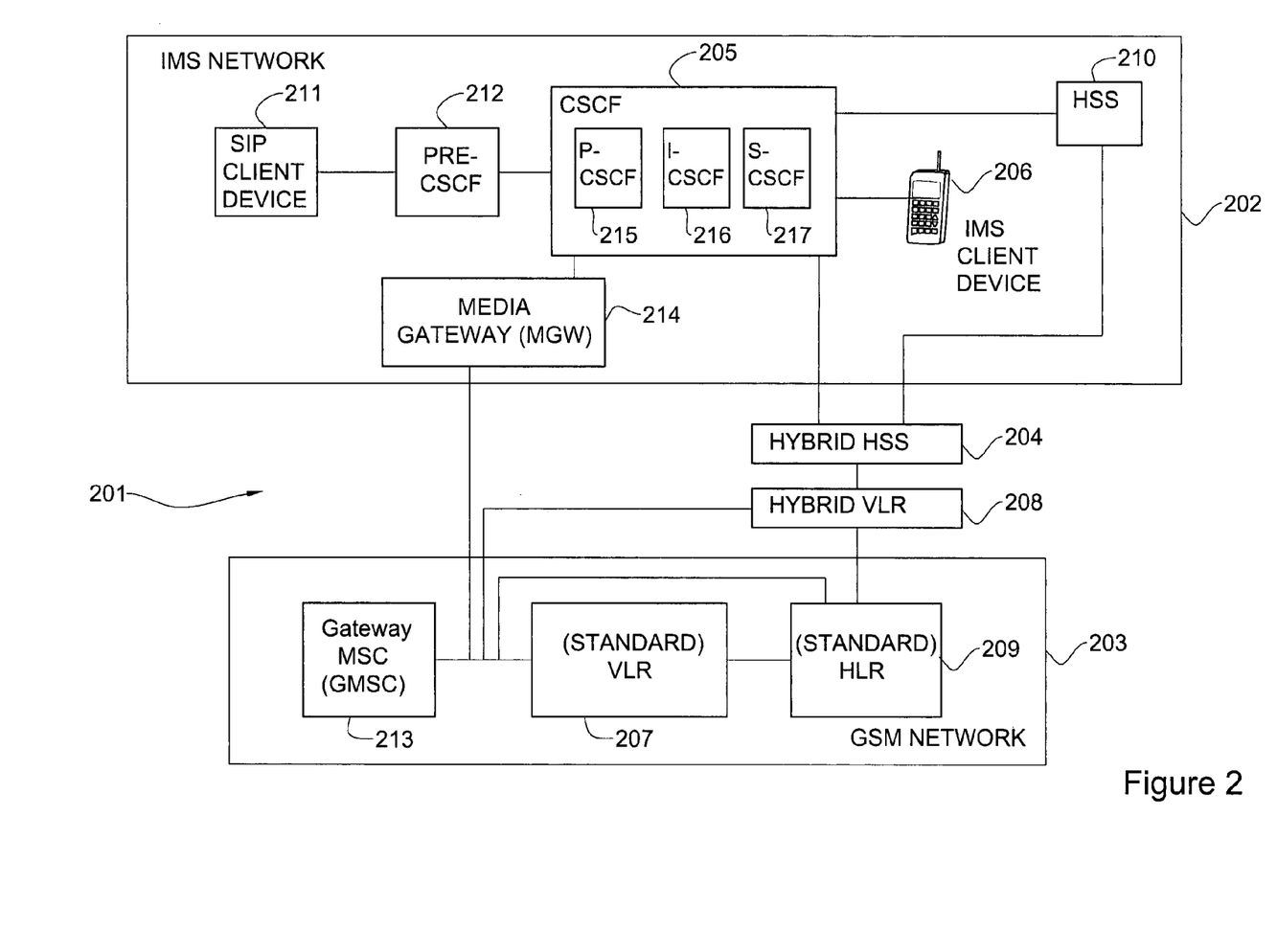
FIG. 2 is a diagram schematically illustrating hybrid network architecture, according to one embodiment of the invention.

FIG. 2 is a diagram schematically illustrating architecture of a hybrid network 201, according to one embodiment of the invention. According to the example, the hybrid network 201 combines an IMS network 202 and a GSM network 203. The IMS network 202 includes a Call Session Control Function (CSCF) 205, as well as a standard Home Subscriber Server (HSS) 210. 206 and 211 represent client devices in the IMS network 202, wherein 206 is an IMS mobile device, while 211 is a software SIP client device, installed on a computer. Presently in the art SIP client devices are represented, sometimes, by a SIP User Agent (UA), which is the logical entity capable of initiating and answering calls. It should be appreciated though that although not illustrated in the figure, other types of client devices are allowed as well in the IMS network 202, such as Personal Digital Assistants (PDAs), etc.

Those versed in the art will appreciate that in the IMS standard architecture the Call Session Control Function (CSCF) is a general definition that truly covers several functions, such as Proxy-CSCF (known as P-CSCF, 215), Interrogating-CSCF (I-CSCF, 216), Serving-CSCF (S-CSCF, 217) and other standard functions if appropriate. Yet, in order to simplify the description of the present invention, the general term "CSCF" (205) is used, wherein it should be clear that the CSCF 205 refers to one or more of the other standard functions. Where it is important to note which function is in use, the specific function is mentioned.

Because the IMS network may include non-IMS devices operating therein, such as SIP devices, it may be required to convert protocols. For example, the Pre-CSCF 212 can add a P-header to SIP packets, thus allowing combination of SIP devices in a standard IMS network. Thus, the IMS network 202 described so far is a standard IMS network. Similarly, the GSM network 203 is also standard. Hence, it includes an HLR 209, as well as a VLR 207 which is coupled to a Mobile Switching Center (MSC) 213 and to a Media Gateway (MGW) 214.

In order to allow double registration (i.e., a single device registered twice, in the IP-based network and in the non-IP-based network) and communication with such devices in accordance with the invention, the hybrid network 201 includes a hybrid VLR 208, coupled to the HLR 207 and to the MGW 214 in the GSM network 203, as well as a hybrid HSS 204, coupled to the CSCF 205 and to the standard HSS 210 in the IMS network 202. The hybrid HSS 204 and the hybrid VLR 208 are coupled therebetween.

Turning now to describe the hybrid HSS 204, it should be appreciated, in this case, that the hybrid HSS 204 contains a unified party profile, i.e., a profile combining information taken from the party's profile in the GSM network and from the profile in the IMS network. While performing double registration, the CSCF 205 addresses the hybrid HSS 204 instead of addressing the standard HSS 210, as done while registering a standard IMS client device (i.e., a device that should be registered in the IMS network alone, unlike double registration). On the GSM network's side, the hybrid VLR 208 is addressed, instead of the standard VLR 207. That is, the hybrid VLR 208 performs authentication and location registration in cooperation with the HLR 209 while using the SIM card identity of the IMS client device (206 or 211).

It is mentioned herewith that the embodiment of FIG. 2 is non-limiting and alternatives are allowed when appropriate. For example, according to one such alternative embodiment, the hybrid HSS 204 can include, or be part of the standard HSS 210. In addition or alternatively, the hybrid VLR 208 can include or be part of the standard VLR 207.

It has been already mentioned that GSM is one, non-limiting example of a non-IP-based network, while IMS is one, non-limiting example of an IP-based network. Therefore, in order to describe FIG. 2 in general terms, instead of HLR 209 this module (209) can be referred to, generally, as a "first registry", while instead of referring to the module 210 by the name "HSS" it can be referred to, generally, as a "second registry".

Figure 3:
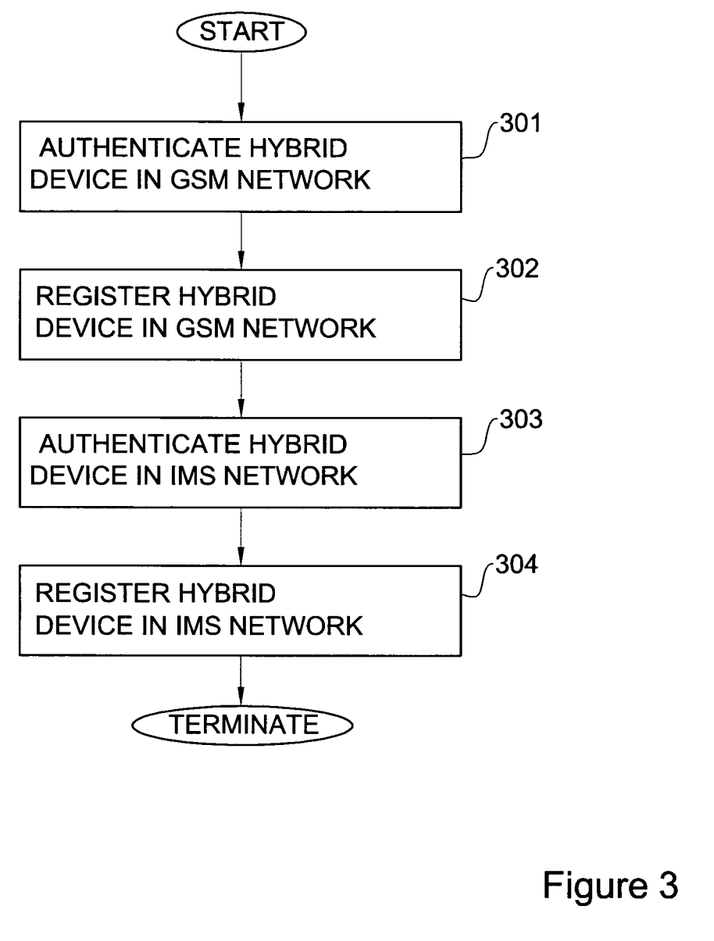
FIG. 3 is a flowchart illustrating the main procedures taken during registration and authentication of a hybrid device, according to one embodiment of the invention.

FIG. 3 is a flowchart illustrating the main procedures taken during registration and authentication of a device (such as 206 or 211), according to one embodiment of the invention. According to certain embodiments a device may issue authentication and registration messages obtained by the CSCF 205 and forwarded thereby to the hybrid HSS 204. The hybrid HSS 204 then communicates with the hybrid VLR 208, which in turn requests the standard VLR 207 to authenticate (on 301) and to register (on 302) the user in the HLR 209. Doing so the hybrid VLR 208 authenticates and registers the device in the GSM network 203 as a GSM device. Then the hybrid HSS 204 authenticates (on 303) and registers (on 304) the device in the IMS network 202. However, this in non-limiting and in other embodiments GSM network authentication and registration can occur after the IMS network authentication and registration, or even in parallel thereto. In addition, it should be realized that the flowchart of FIG. 3 illustrates only those main procedures taken during registration and authentication, while other procedures may be taken as well, such as paging etc.

Appreciating that further to operating in accordance with the flowchart of FIG. 3 the device is registered in the GSM network as well as in the IMS network, it is noted that the device is double-registered, while without this double registration, communication in accordance with the invention is disabled. Therefore, the double registration depicted in FIG. 3 (and alternatives thereof) enables communication in accordance with embodiments of the invention.

A person versed in the art will appreciate that GSM authentication (301) can be performed, e.g., when the standard VLR 207 invokes a MAP-AUTH service (MAP-authenticate service, which is part of the GSM/UTMS Mobile Application Part, MAP, service definition) performed by the MSC 213, with or without using the Mobile Application Part Interface (MAPI). Authentication can use the International Mobile Subscriber Identity (IMSI) of the SIM card, e.g., by invoking Send_IMSI_request, Send_IMSI_Indication, Send_IMSI_Response etc. Although not mentioned above, the standard VLR may obtain an indication of the success or failure of the authentication service, wherein this indication can be forwarded to other modules in the hybrid network, such as the hybrid HSS 204 and therefrom to the CSCF 205 and/or to the standard HSS 210.

GSM registration (302) can be performed, e.g., when the standard VLR 207 invokes the MAP-Update-Location service, thus informing the HLR 209 of the device's location.

After the GSM authentication and registration has completed, the hybrid HSS 204 invokes authentication and registration procedures on the standard HSS 210 for authenticating and registering the device in the IMS network 202, e.g. by using the Diameter protocol defined by RFC 3588, which is a protocol for Authentication, Authorization and Accounting (AAA). Consequently, the device (such as 206 or 211) is registered in the HSS 210 as well as in the HLR and hybrid VLR.

According to certain embodiments of the invention, further to the procedures described above with reference to FIG. 3, the hybrid HSS 204 may obtain a party's GSM-profile from the HLR 209, e.g., via an interface established between the hybrid HSS and the standard VLR 207. The hybrid HSS 204 may further receive the party's IMS-profile from the HSS 210, e.g., via a standard IMS Diameter interface. Consequently, the hybrid HSS 204 may obtain, or compose, a unified profile, containing information taken from the GSM and/or from the IMS profiles. The hybrid HSS 204 can then coordinate between the profiles, and update the IMS profile with GSM parameters (such as call barring), via the Diameter interface.

Returning now to FIG. 2, with reference thereto it was mentioned that the device 211 can be a SIP or an IMS device, it should be appreciated that if the device 211 is a SIP device (unlike an IMS device), it sends SIP messages, which lack the IMS' Private header (known as P-header) extensions to SIP. Therefore, upon registration of a SIP device in the hybrid network, protocol conversion to IMS is essential. According to certain embodiments of the invention, the Pre-CSCF 212 adds the required P-headers and forwards the messages to the Proxy CSCF (P-CSCF, 215) which in turn completes the registration process.

This is not limited only for registration of SIP devices to an IMS network or to any other IP-based network different than SIP. Appreciating that the SIP client device conveys data packets while communicating with other entities, it is possible to obtain these packets (whether they relate to registration or to any other procedure) and convert them into packets that conform with the IP-based network, e.g., by adding the proper header thereto as was previously explained with reference to converting SIP communication to IMS communication. Then, the converted packets can be further conveyed to entities in the IP based network, thus allowing communication between the SIP client device and the entities.

Figure 4:
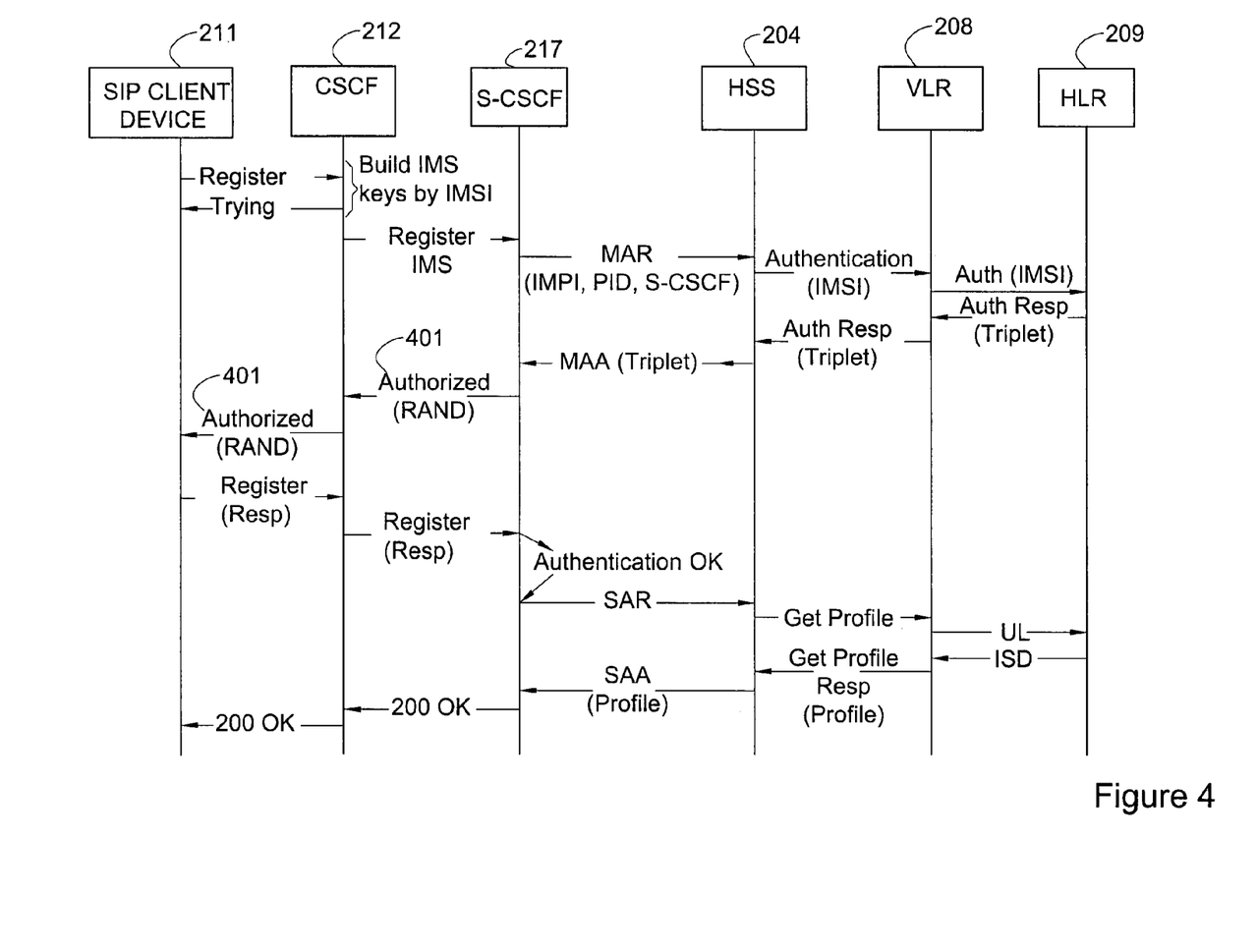
FIG. 4 is a flow diagram illustrating message flow in double registration of a device, in accordance with one embodiment of the invention.

Further to identifying the modules being part of the hybrid network, according to the example of FIG. 2, and to understanding the main procedures taking place during double registration of a device, a flow diagram illustrating the registration flow will follow, with reference to FIG. 4, which is a flow diagram illustrating double registration of a device, in accordance with one embodiment of the invention. But before turning to the description thereof, it should be noted that the embodiment of FIG. 2 is non-limiting and alternatives are allowed when appropriate. For example, according to one such alternative embodiment, the hybrid HSS 204 can include, or be part of the HSS 210. In addition or alternatively, the hybrid VLR 208 can include or be part of the standard VLR 207.

In FIG. 4 several modules are represented. These are the SIP client device 211, the Pre-CSCF 212, the S-CSCF 217, the hybrid HSS 204, the hybrid VLR 208 and the HLR 209. Further to reading the description provided above, with reference to FIGS. 2 and 3, it is appreciated that if a SIP client device (211) is a member in the network, in order to communicate in the IMS network 202, it must communicate via a protocol-conversion element, represented by the Pre-CSCF 212, and exchange messages therewith. These messages are represented in FIG. 4 as "register" and "trying" messages, however, this is non-limiting. The Pre-CSCF 212 in turn inserts the proper headers into the SIP messages, e.g., based on the SIM card's International Mobile Subscriber Identity (IMSI), and forwards a standard IMS message to the S-CSCF (217). In those cases when the device is an IMS device (unlike the SIP device mentioned so far) the Pre-CSCF is not required and the flow can start with direct communication of the IMS device with the CSCF.

The S-CSCF sends a known per se MAR request to the Hybrid HSS 204, which conveys an authentication request to the hybrid VLR 208, which in turn forwards an authentication request to the HLR 209. Further to authenticating the device, the HLR returns an authentication response to the hybrid VLR, which forwards the response to the device.

It is noted that authorization and registration of the device in the IMS network (i.e., in the standard HSS) is known per se. After verifying that the device is authorized by the HLR, registration is performed.

It is noted that communication in this embodiment is indirect. That is, the device communicates with the pre-CSCF, which communicates with the S-CSCF, which communicates with the hybrid HLR, which in turn communicates with the hybrid VLR that communicates with the HLR. Remembering that the HLR was referred to, generally, as a "first registry", it is appreciated that the embodiment of FIG. 4 discloses indirect contact with the first registry. Yet, this is non-limiting and direct contact with the first registry is allowed as well.

Further to registering a device in the first and second registries (in the embodiment described in FIG. 4, wherein the IP-based network and the non-IP-based network are IMS and GSM, respectively, the first and second registries are the HLR and the <standard> HSS), a first party can call a second party whose device is an IP-based device, by using a non-IP based addressing scheme, such as MSISDN.

Figure 5:
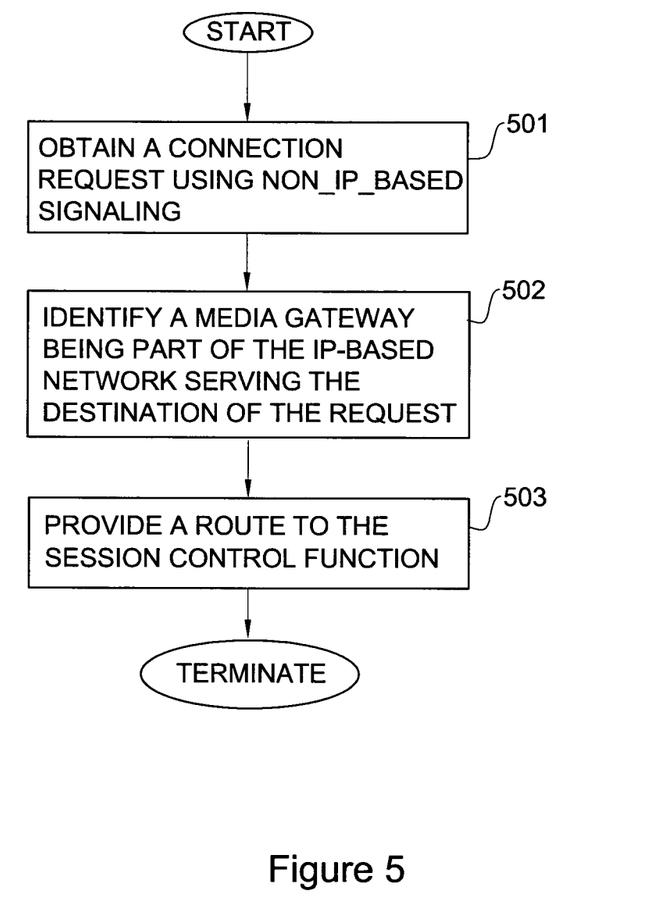
FIG. 5 is a flowchart illustrating the main procedures taken when initiating a call from a first party calling a second party having an IP-based device, according to one embodiment of the invention.

FIG. 5 is a flowchart illustrating the main procedures taken when initiating a call from a first party calling a second party having an IP-based device, according to one embodiment of the invention. It is noted that according to certain embodiments these procedures may be taken by the hybrid VLR 208. According to the flowchart, on 501 the hybrid VLR obtains a connection request from a first party's device. It is noted that obtaining the connection can be direct or indirect, e.g., via a Gateway MSC coupled to an MSC 213 to which the first party's device is connected. The connection request uses non-Internet-protocol based signaling, such as ISUP (ISdn User Part) which is considered part of the SS7 signaling, and it is indicative of a second party's device with which the first party wishes to communicate. The second party's device uses IP-based signaling for communication, that is, it is operating in an IP-based network.

Then, on 502, the hybrid VLR identifies a media gateway being part of the IP-based network, that is able to convert the call signaling from non-IP to IP based signaling (such as from ISUP to SIP), and is able to provide a route to a session control function (such as the S-CSCF in IMS) in response to the connection request.

Figure 6:
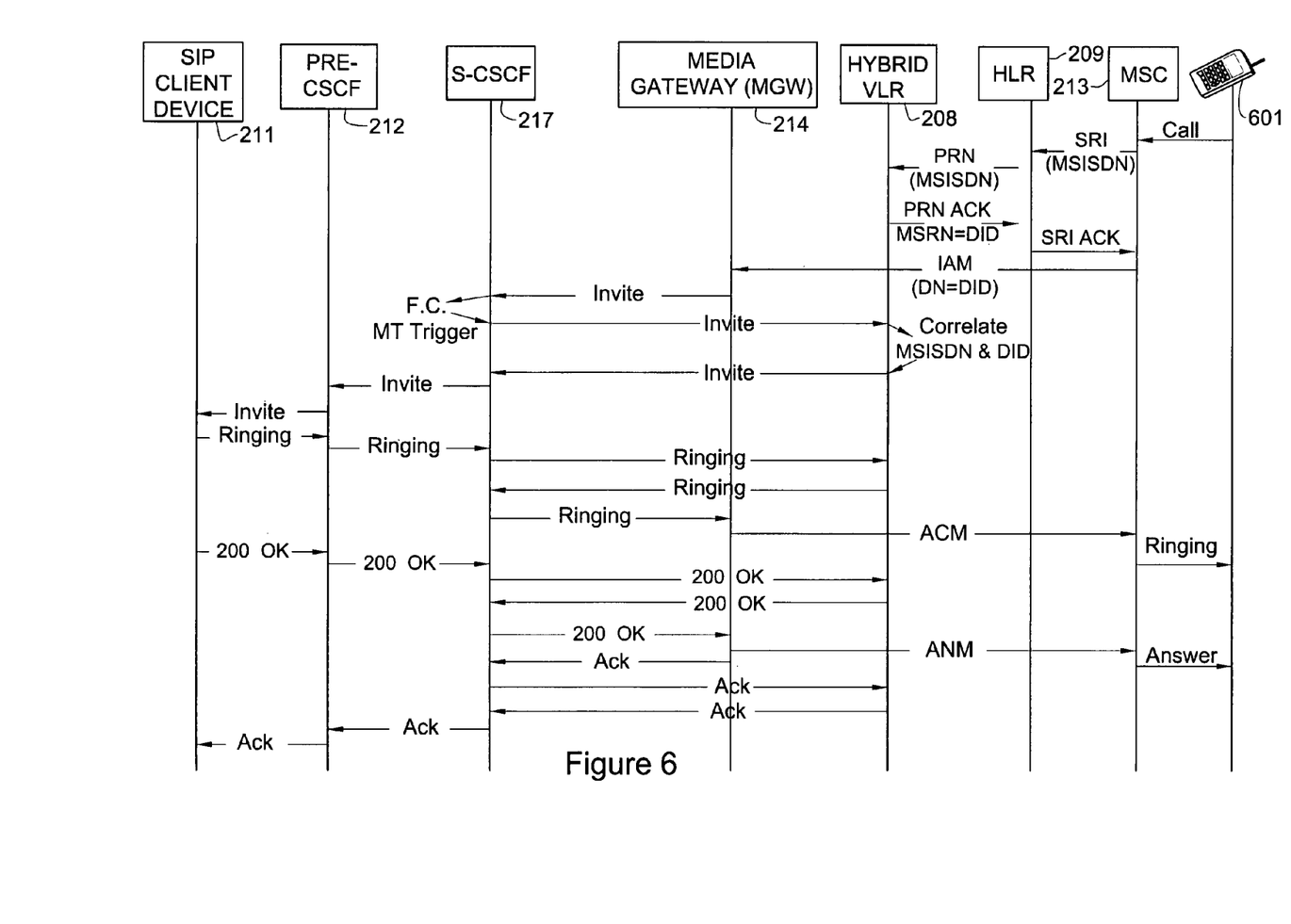
FIG. 6 is a flow diagram illustrating message flow while initiating a call from a first party calling to a second party having an IP-based device, according to one embodiment of the invention.

Further to understanding the main procedures followed while initiating the connection, as described by FIG. 5, attention is drawn now to FIG. 6, which is a flow diagram illustrating message flow while initiating a call from a first party (who operates device 601) calling to a second party having an IP-based device (211), according to one embodiment of the invention. The diagram of FIG. 6 assumes that the first party operates a GSM mobile telephone 601 and dials to the second party while using a non-IP-based addressing scheme such as MSISDN. In this example the signaling used by the device 601 is ISUP. However, this is non-limiting and it should be appreciated that the invention applies also to other devices operated by the first party, as long as the first party calls the second party by dialing his non-IP-based address.

According to the example of FIG. 6 the first parties' device 601 signals the initiation of a call to its respective MSC 213. The MSC sends an SRI (Send Routing Information) query to the HLR 209, which in turn queries the hybrid VLR for the second party's MSRN (Mobile Station Roaming Number). It is noted that the second party's device is a SIP device that was previously double-registered, and hence it is the hybrid VLR 208 that is registered in the HLR 209 as the VLR respective of the device. Returning to FIG. 5, hence, the MSRN query obtained by the hybrid VLR is considered as a response to obtaining a connection request 501. Back to FIG. 6, in the response, the hybrid VLR returns a Direct In Dialing (DID) number associated with the MSRN, which is then forwarded to the MGW 214.

It is noted that initially the MGW 214 coordinates the connection between the MSC 213 and the S-CSCF 217 by forwarding the call's signaling thereto, after converting it from ISUP to SIP.

Because the identification of second party's device is no longer carried by the signaling, in order to identify the second party's device, the S-CSCF 217 contacts the hybrid VLR 208, where the DID and the MSISDN addresses can be correlated to identify the SIP client device 211. It is appreciated that when the SIP client device is identified, the S-CSCF can route the call thereto. If the client device is not an IMS client device, as illustrated in the figure (wherein the client device is a SIP client device), protocol conversion is required, and therefore signaling is routed via the pre-CSCF 212.

As aforementioned, e.g., with reference to FIGS. 5 and 6, a device operating with non-IP based signaling (and dialing out while using non-IP based addressing schemes) can initiate a connection with a device operating in an IP-based network and using IP-based signaling. It should be appreciated now that the opposite direction is also allowed in accordance with certain embodiments of the invention, and hence attention is drawn now to FIG. 7, which provides a flow diagram illustrating message flow while initiating a call from a party calling from a device 211 connected to an IP-based network to a party operating a device 601 connected to a non-IP based network.

As was previously explained with reference to FIGS. 4 and 6, the diagram represents a SIP client device 211 and therefore also a Pre-CSCF 212. However, if the client device is an IMS device (such as device 206 in FIG. 2), unlike a SIP device, the Pre-CSCF is not required and so is also the messaging exchanged between the SIP device 211 and between the Pre-CSCF 212.

Figure 7:
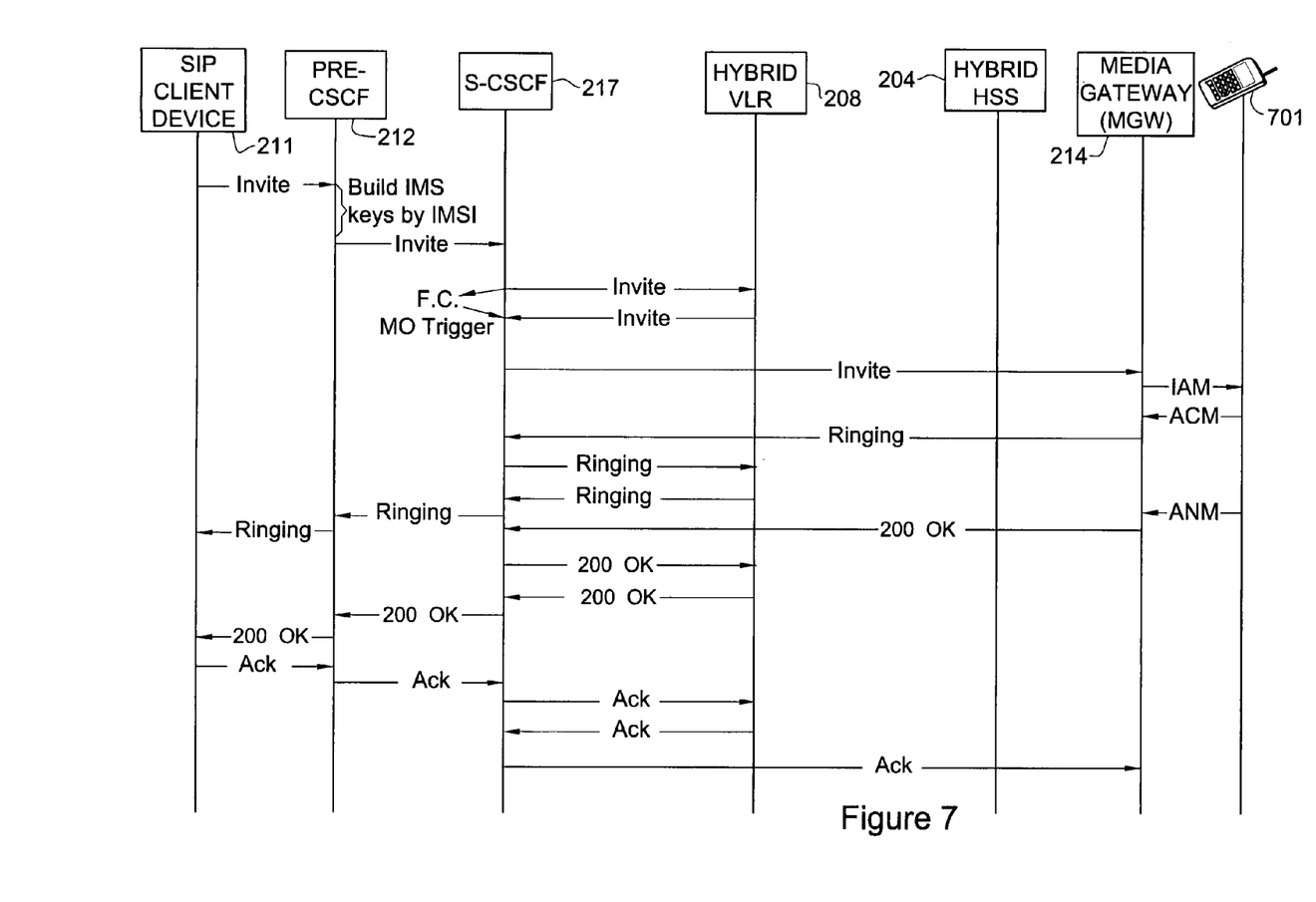
FIG. 7 provides a flow diagram illustrating message flow while initiating a call from a party calling from a device connected to an IP-based network to a party operating a device connected to a non-IP based network, according to one embodiment of the invention.

According to the flow represented by FIG. 7, the client device (or the Pre-CSCF on its behalf) forwards a connection request ("invite") to the S-CSCF 217. The CSCF can use the known per se standard Filter Criteria (F.C.) mechanism in order to forward the connection request to the hybrid VLR 208. It is appreciated that the hybrid VLR 217, which is coupled to the (standard) VLR 207, to the MSC 213 as well as to the HLR 209, has access to call parameters/features, such as "prepaid" etc. Then the S-CSCF transfers, or routes the call to the MGW 214, that in turn, according to the example, converts the SIP communication into ISUP. It should be appreciated that in FIG. 7 the device 601 is a GSM (i.e., non-IP based) device. This is not obligatory and the device can be any different device, including a device in a non-IP based network different than GSM (such as CDMA) or even a device in an IP-based network (such as IMS). In the latter case the S-CSCF will route the connection to the proper component in the network, as presently done in a standard IMS network.

It is noted though that FIGS. 5, 6 and 7 discuss initiation of a call. However, this should not limit the invention while it should be understood the according to other embodiments of the invention the same flows (or other flows in the same spirit) can be used for initiating other kind of connections, such as sending an SMS (Short Message Service) or a Multimedia Message etc.

Figure 8:
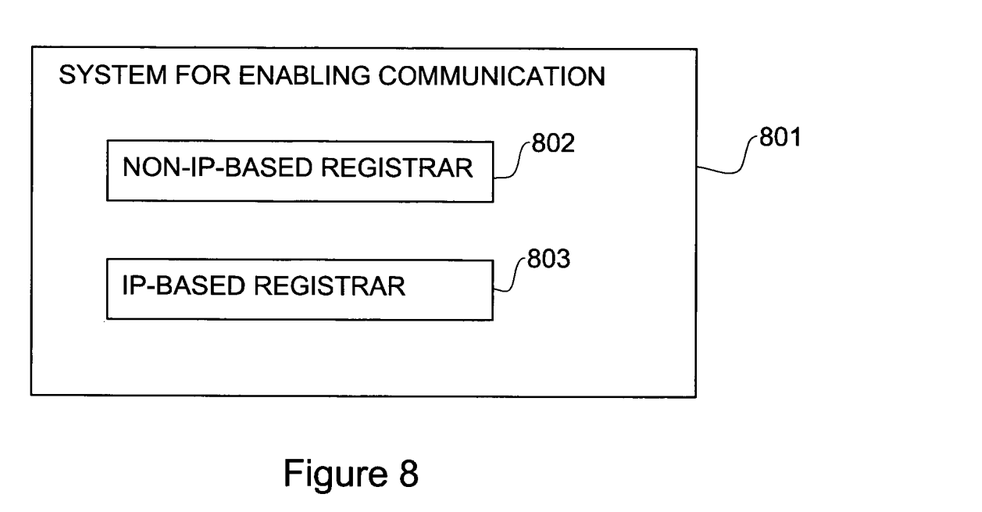
FIG. 8 illustrates a system for enabling communication with a party operating in a hybrid network, according to one embodiment of the invention.

FIG. 8 illustrates a system 801 for enabling communication with a device of a party operating in a hybrid network, such as a hybrid HSS 204, according to one embodiment of the invention. According to the embodiment the system 801 includes a non-Internet-Protocol based registrar 802 and an Internet-protocol based registrar 803. The non-Internet-Protocol based registrar 802 is adapted for contacting in a direct or indirect manner a first registry being a member in the non-Internet-protocol based network for registering the device in the non-Internet-protocol based network. The Internet-protocol based registrar 803 is adapted for contacting a second registry being a member in the Internet-protocol based network, for registering the device in the Internet-protocol based network.

According to one example the non-Internet-Protocol based registrar 802 operates in accordance with the flow diagram of FIG. 4, while it was noted before that registering a device in the Internet-protocol based network (by the Internet-protocol based registrar 803) can be done in accordance with the standard.

Figure 9:
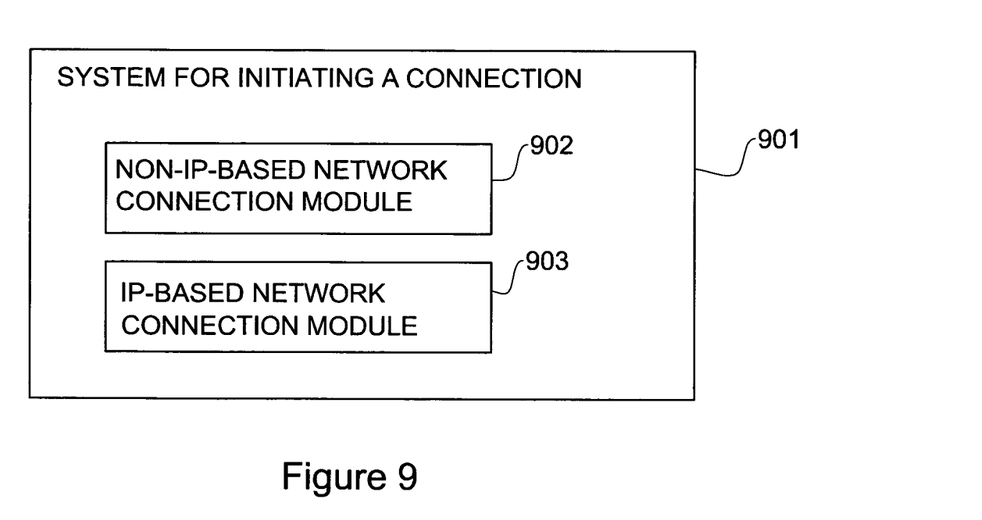
FIG. 9 illustrates a system for initiating a connection, according to one embodiment of the invention.

FIG. 9 illustrates a system 901 for initiating a connection, such as hybrid VLR 208, according to one embodiment of the invention. According to the embodiment the system 901 includes a non-Internet-protocol-based network connection module 902, and an Internet-protocol-based network connection module 903.

The non-Internet-protocol-based network connection module 902 is adapted for obtaining a connection request whose destination is the device of the second party, wherein the connection request uses a non-Internet-protocol based signaling. The Internet-protocol-based network connection module 903 is adapted for responding to the connection request by providing a route to a session control function being a member in the Internet-protocol based network which is combined in the hybrid network, the session control function serves the device of the second party.

Figure 10:
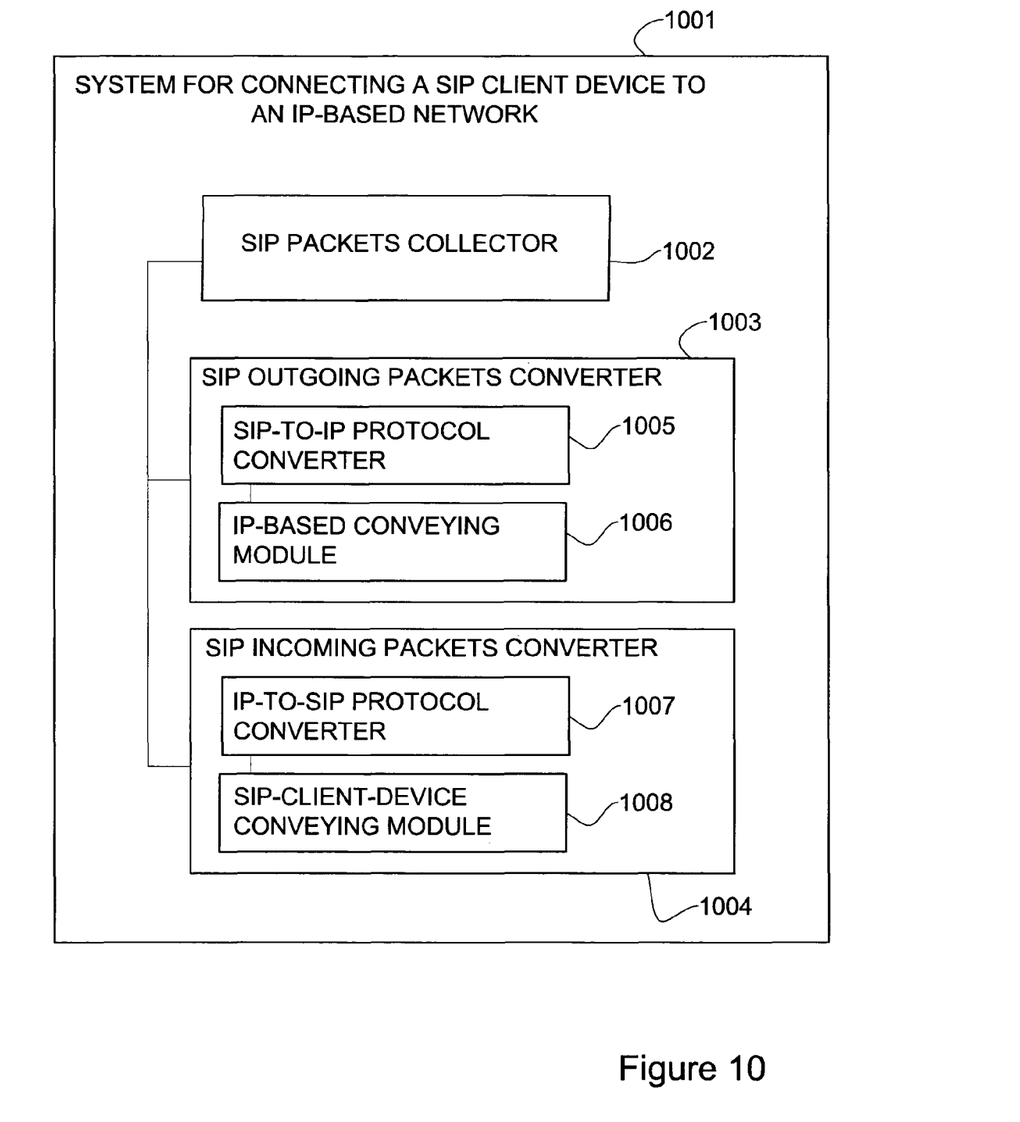
FIG. 10 illustrates a system for connecting a SIP client device to an Internet-protocol based network, according to one embodiment of the invention.

FIG. 10 illustrates a system 1001 for connecting a SIP client device to an Internet-protocol based network incompatible with the SIP client device, such as Pre-CSCF 212, according to one embodiment of the invention. The system includes a SIP packets collector 1002, to which a SIP outgoing packets converter 1003 and a SIP incoming packets converter 1004 are coupled. The SIP packets collector 1002 is adapted for obtaining packets. The SIP outgoing packets converter 1003 is adapted for converting packets that are conveyed by the SIP client device, while the SIP incoming packets converter 1004 is adapted for converting packets that are conveyed to the SIP client device.

According to the embodiment, the SIP outgoing packets converter 1003 includes a SIP-to-IP protocol converter 1005 for converting the SIP packets into packets conforming with the Internet-protocol based network, and an Internet-protocol-based conveying module 1006, coupled to the SIP-to-IP protocol converter 1005 for conveying the conforming packets to entities in the Internet-protocol based network, thus connecting the SIP client device with the Internet-protocol based network.

In addition, according to the embodiment, the SIP incoming packets converter 1004 includes an IP-to-SIP protocol converter 1007 for converting the packets into packets compatible with the SIP client device, and a SIP-client-device conveying module 1008, coupled to the IP-to-SIP protocol converter 1007, for conveying the compatible packets to the SIP client device.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

The present invention has been described with a certain degree of particularity, but those versed in the art will readily appreciate that various alterations and modifications may be carried out, without departing from the scope of the following Claims:

The invention claimed is:

1. A method of initiating a connection between a device of a first party and a device of a second party, the device of the first party initiates the connection by using an addressing scheme usable in a non-Internet-Protocol based network, the device of the second party is an Internet-Protocol (IP)-based device operating in a hybrid network combining a non-IP based network and an IP based network, the method comprising:
   (a) obtaining by a registry serving the non-IP based network a connection request addressed to the IP-based device of the second party as a destination, wherein the connection request uses a non-IP based signaling and is obtained by the registry without involvement of an IP-based signaling, and wherein the registry does not comprise at least one interface supporting the IP-based signaling;
   (b) requesting a hybrid Visitor Location Register (VLR) to provide a routing information associated with the device of the second party, wherein the hybrid VLR is configured to perform, in cooperation with the registry, authentication and location registration of the IP-based device of the second party; and
   (c) providing a route to a Call Session Control Function (CSCF) configured to serve the IP- based network, thereby terminating the connection request at the device of the second party, wherein the route is provided using the routing information received from the hybrid VLR.

2. The method of claim 1, wherein the non-Internet-protocol based signaling is Isdn User Part.

3. The method of claim 1, wherein the non-Internet-protocol based network operates in accordance with one of GSM (Global System for Mobile communications), CDMA (Code Division Multiple Access) and UMTS (Universal Mobile Telecommunications System).

4. The method of claim 1, wherein the IP-based network is an IP Multimedia Subsystem (IMS) network.

5. The method of claim 1, wherein the registry is an Home Location Register (HLR) comprising an identification of the hybrid VLR serving the device of the second party.

6. The method of claim 5, wherein the hybrid VLR is a part of a standard VLR.

7. The method of claim 5, wherein the hybrid VLR includes a standard VLR.

8. A computer program embodied on a non-transitory computer readable medium and comprising computer program code for causing a system capable of initiating a connection between a device of a first party and a device of a second party to perform all the steps of claim 1 when said program is run on a computer.

9. A system capable of initiating a connection between a device of a first party and a device of a second party, the device of the first party configured to initiate the connection by using an addressing scheme usable in a non-Internet-Protocol (IP) based network, the device of the second party is an IP-based device operable in a hybrid network combining a non-IP-based network and an IP-based network, the system comprising:
   (a) a non-IP based network connection module configured to obtain a connection request whose destination is the device of the second party, wherein the non-IP based network connection module is configured to obtain the connection request using only a non-Internet-protocol based signaling; and
   (b) an IP-based network connection module configured to provide a route to a Call Session Control Function (CSCF) configured to serve the IP-based network and enable terminating the connection request at the device of the second party;
   wherein the non-IP-based network connection module comprises a registry configured to serve the non-IP based network and does not comprising at least one interface supporting the IP-based signaling; and a hybrid Visitor Location Register (VLR) operatively connected to the registry and configured to perform, in cooperation with the registry, authentication and location registration of the IP device of the second party;
   wherein the hybrid VLR is further configured to provide the IP-based network connection module, responsive to a request by the registry issued in response to the connection request, a routing information associated with the IP-based device of the second party, and
   wherein the IP-based network connection module is configured to provide the route to the CSCF using the routing information received from the hybrid VLR.

10. The system of claim 9, wherein the non-IP based signaling is ISUP.

11. The system of claim 9, wherein the non-Internet-protocol based network operates in accordance with one of GSM (Global System for Mobile communications), CDMA (Code Division Multiple Access) and UMTS (Universal Mobile Telecommunications System).

12. The system of claim 9, wherein the IP-based network is an IP Multimedia Subsystem (IMS) network.

13. The system of claim 9, wherein the registry is an Home Location Register (HLR) comprising an identification of the hybrid VLR serving the device of the second party.

14. The system of claim 13, wherein the hybrid VLR is a part of a standard VLR.

15. The method of claim 13, wherein the hybrid VLR includes a standard VLR.

16. A method of operating a hybrid network combining a non-Internet-Protocol (IP) based network and an IP based network, the method comprising:
   (a) configuring the hybrid network to comprise a hybrid Visitor Location Register (VLR) configured to perform, in cooperation with an Home Location Register (HLR) serving the non-IP based network, authentication and location registration of an at least one IP-based device, wherein the HLR does not comprise at least one interface supporting an IP-based signaling;
   (b) in response to a connection request issued in accordance with a non-Internet-protocol addressing scheme, addressed to the at least one IP-based device and received by the HLR, requesting, the hybrid VLR to provide a routing information associated with the at least one IP-based device;
   (c) providing a route to a Call Session Control Function (CSCF) serving the Internet-protocol based network for terminating the connection request at the at least one IP-based device, wherein the route is provided using the routing information received from the hybrid VLR.

* * * * *